Aug. 14, 1951  H. A. KNOX  2,563,848
TRACK SHOE WITH HOOK CONNECTION
Filed Aug. 26, 1947  2 Sheets-Sheet 1
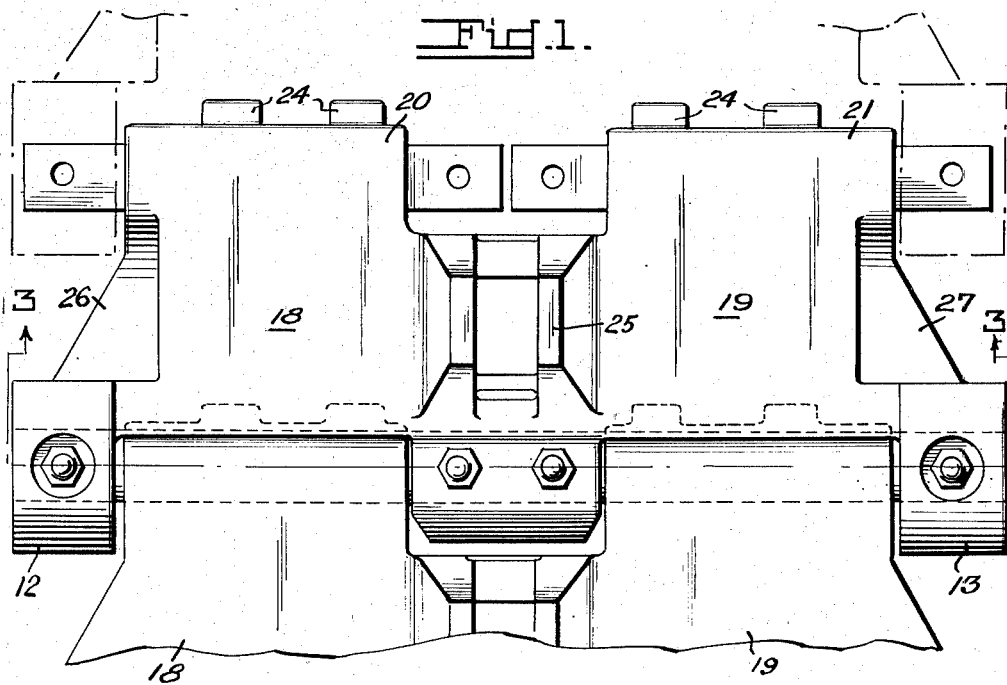
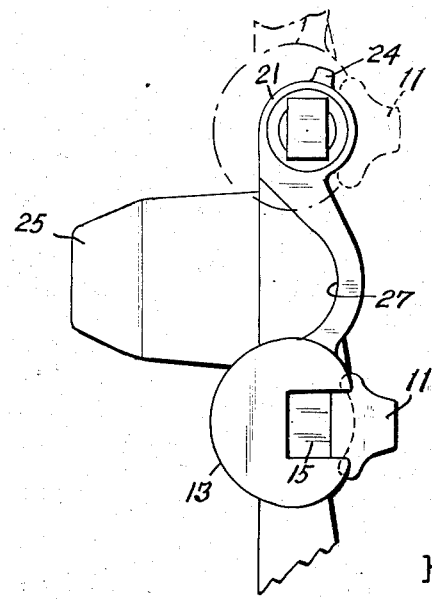
Inventor,
Harry A. Knox
By J. H. Church & W. E. Thibodeau
Attorneys

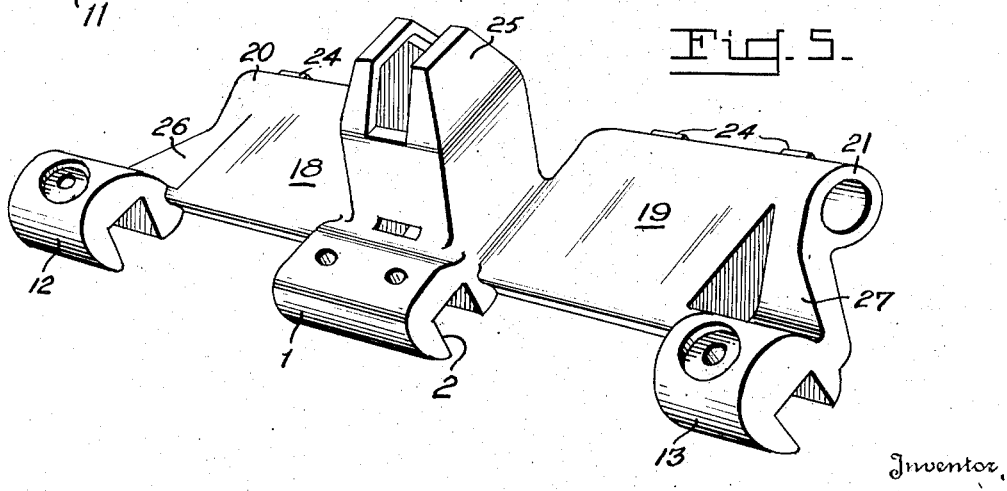

Patented Aug. 14, 1951

2,563,848

UNITED STATES PATENT OFFICE 2,563,848

TRACK SHOE WITH HOOK CONNECTION

Harry A. Knox, Washington, D. C.

Application August 26, 1947, Serial No. 770,702

4 Claims. (Cl. 305—10)

(Granted under the act of March 3, 1883, as amended April 30, 1928; 370 O. G. 757)

The invention described herein may be manufactured and used by and for the Government for governmental purposes without the payment of any royalty thereon.

This invention relates to a track shoe for tracklaying vehicles, and in particular to a shoe of the single pin type.

In the known tracks it has been customary to assemble by driving a pin through portions of adjacent shoes. The present invention combines a ready means of assembly by hooking an end portion of one track over the adjacent pin of the next track and bolting thereto, and provides a convenient means of attaching grousers with the same attaching means.

It is therefore an object of the invention to provide a track shoe which is convenient of assembly both as to track body and to the ground gripping means, further objects being to provide a shoe which obviates pin driving and is smooth and efficient of assembly and operation.

Further objects will be apparent from the accompanying specification and the drawings in which like reference characters refer to like parts throughout, and in which Figure 1 is a top plan view of one complete shoe and a portion of the succeeding shoe, Figure 2 is a right end view of Figure 1, Figure 3 is a sectional view taken along the line 3—3 of Figure 1, Figure 4 is a section taken along the line 4—4 of Figure 3, and Figure 5 is a view in perspective of a shoe.

The shoe proper has a center hook portion 1, having a rectangular channel 2 receiving the rectangular inner ends 3, 4 of shafts 5, 6 respectively. Cap screws 7, 8 pass through the hook and the pin ends and are threaded as at 9, 10 for attachment of the grouser 11.

End hook portions 12, 13 similarly receive the shaft ends 14, 15 and secure the grouser by screws 16, 17. The left end hook and the right end hook, each in common with the center hook, are connected through web portions 18, 19 with bearing sleeves 20, 21, respectively, each carrying a shaft 5, 6 oscillatable therewith through bearings 22 and rubber anchorages 23. Stops 24 are provided on the sleeves to limit oscillation. A guide member 25 is provided behind the center hook portion 1, bridging the web portions 18, 19. Arcuate portions 26, 27 in the web receive the driving sprockets preferably of the roller type.

In assembly, the shafts 5, 6 with their bearings and seals are inserted in each sleeve such as 20, 21. Assembly is then completed by laying each hooked end of a shoe over a shaft-bearing end, applying the grousers and threading in the cap screws. In operation, as the shoes pass around bogie wheels or idlers, limited relative rotation will take place between a shoe and the sleeves of the adjacent shoe.

It will thus be seen that the invention provides a novel track shoe that is easy of assembly and disassembly, and which makes for fewer parts, and ease and certainty of performance.

I claim:

1. A one-piece track shoe for tracklaying vehicles comprising a plurality of coplanar, flat web portions, a plurality of spaced bearing sleeves extending from one transverse edge of each respective web portion, said bearing sleeves having aligned bores therethrough, a plurality of hook portions extending from the other transverse edge of the respective web portions, said hook portions having aligned openings generally rectangular in cross-section and opening through one side of each portion, a pin rotatably mounted in each sleeve, each pin having end portions rectangular in cross-section for snug, non-rotative engagement in the openings of the hook portions of a next-adjacent shoe, a grouser having an extension rectangular in cross-section mounted in all of said openings, and screw means engaging said hook portions, pins and grouser for fastening said grouser and said end portions in said openings.

2. The apparatus according to claim 1 wherein said bearing sleeves and said hook portions are staggered at opposite, transverse edges of said web portions.

3. A one-piece track shoe for tracklaying vehicles comprising a plurality of web portions having flat coplaner upper sides, a plurality of spaced bearing sleeves extending from one transverse edge of each respective web portion, said bearing sleeves having aligned bores therethrough, a plurality of hook portions extending from the other transverse edge of the respective web portions, said hook portions having aligned recesses generally rectangular in cross-section and opened at the underside thereof, a pin rotatably supported in each bearing sleeve, each pin having end portions rectangular in cross-section for snug, non-rotative engagement in the recesses of the hook portions of the next adjacent shoe, a grouser having an extension rectangular in cross-section and of a transverse dimension substantially equal to the distance between the outer faces of the two outermost hook portions, said extension being mounted in all of said recesses below said end portions, and screw means engaging said hook portions, end portions and extension for fastening said grouser and said end portions in said recesses.

4. The apparatus according to claim 3, wherein said bearing sleeves and said hook portions are staggered at opposite, transverse edges of said web portions.

HARRY A. KNOX.

REFERENCES CITED

The following references are of record in the file of this patent:

UNITED STATES PATENTS

| Number | Name | Date |
| --- | --- | --- |
| 1,261,082 | White | Apr. 2, 1918 |
| 1,684,918 | Jereczek | Sept. 18, 1928 |
| 1,791,306 | Gilliland | Feb. 3, 1931 |
| 2,141,421 | Taylor | Dec. 27, 1938 |
| 2,339,273 | Knox | Jan. 18, 1944 |